April 4, 1933. H. E. LAUNDERVILLE 1,903,310
STEAM COOKER
Filed Aug. 19, 1931
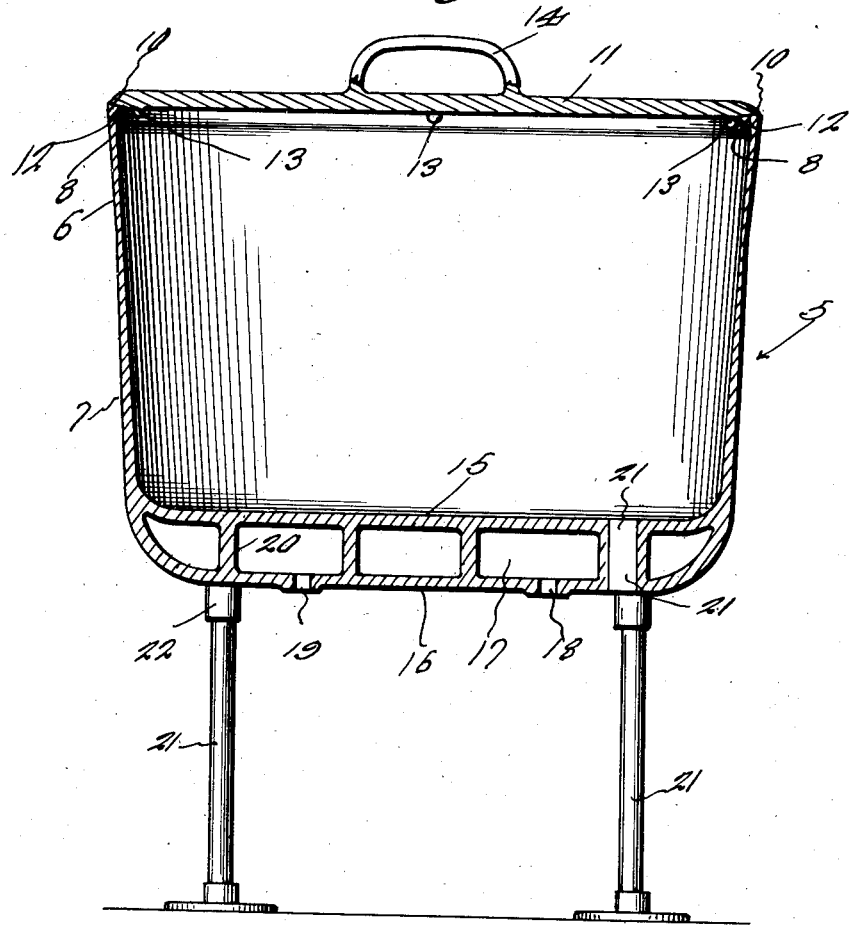
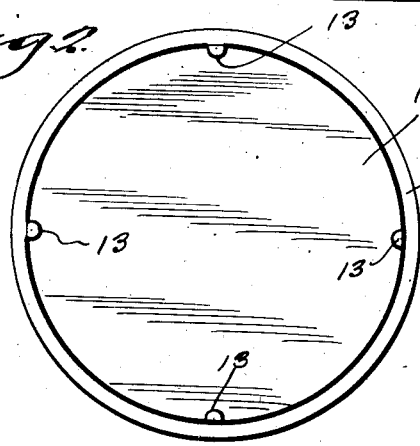
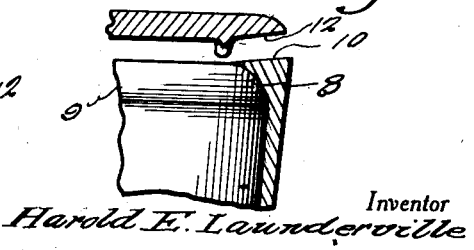
Inventor
Harold E. Launderville
By Clarence A. O'Brien
Attorney Patented Apr. 4, 1933

1,903,310

UNITED STATES PATENT OFFICE

HAROLD E. LAUNDERVILLE, OF OGDENSBURG, NEW YORK

STEAM COOKER

Application filed August 19, 1931. Serial No. 558,169.

The object of this invention is in the provision of means for cooking meat, vegetables, fruits without the need of water.

A still further object of the invention is to provide an improved steam cooker for cooking meat, vegetables and fruit in the manner above suggested.

A still further object of the invention is to provide an improved cooking vessel wherein the wall thereof is particularly constructed to serve as an efficient conductor of heat without a jacket up the sides, as heretofore employed and thereby reduce construction cost, as well as to economize in fuel consummation.

Other objects and advantages of the invention will become apparent from a study of the following description, taken in connection with the accompanying drawing wherein:

Figure 1 is a vertical sectional view taken through the cooker.

Figure 2 is a bottom plan view of the cover, and

Figure 3 is a fragmentary detail sectional view on an enlarged scale for clearly showing the contracting surfaces of the vessel and cover therefor.

In the preferred embodiment of the invention, and as shown in the drawing, there is provided a vat kettle or receptacle 5 formed of suitable wear resisting material preferably metal, and having its peripheral wall provided with upper and lower oppositely tapering portions 6 and 7, the outer surface of the walls at said tapered portion being inclined, while the inner surface of the wall for the full depth of the vessel is uniform.

At its uppermost edge, the peripheral wall of the vessel is thickened as at 8, and at said thickened edge has its inner face slightly concaved as at 9. The upper edge of the wall is beveled as at 10.

For closing the upper open end of the receptacle, there is provided a cover 11 that adjacent its peripheral edge has its under face beveled as at 12 for fitting flatly on the beveled edge 10 of the wall. Inwardly from said edge, the lid or cover 11 is provided with keeper lugs 13 engageable with the inner face of the wall to retain the cover against lateral displacement. The cover is also provided with a suitable handle 14.

The devices just described may be used by merely placing the same on a hot plate, stove or the like.

However, in order that the same may be in the nature of a self contained cooker, the receptacle is provided with a false bottom 15 forming with the true bottom 16 of the receptacle a steam chamber 17 through which circulates live steam, the same entering the chamber through an intake port 18, and passing therefrom through an outlet port 19 in the bottom 16. Stays 20 are provided between the false bottom 15, a bottom 16 permitting free passage of steam to port 19.

For the receptacles there is also provided a suitable drum 21 in the bottom of the receptacle.

When using the steam chamber, the receptacle may be supported on legs or suitable supports 22 and the vessel may be secured to or otherwise mounted on the upper ends of the supports 21 as at 22.

In actual practice, the meat, potatoes or like article to be cooked is placed in the receptacle 5, and may be cooked while arranged therein without the addition of water as is now usually required in cooking said articles of food.

In cooking the food, without immersing it in water, as comprehended by the present invention, vapor from the food naturally rises to the lid where it is condensed to fall by gravity into the receptacle, in the form of droplets. The concave surface 9 tends to direct the vapors inwardly toward the center prior to such vapors coming into contact with the lid. Also, such condensation formed between the surfaces 10, 12 will by gravity return to the receptacle. Thus the vapors generated by the food valuable of itself, is entirely guarded against loss at the required cooking temperature, which is considerably lower in this method of cooking, than when water is used.

Further, due to the peculiar construction of the wall of the receptacle a better distribution of heat due to the increase in temperature in the zone is attained, this particular type of wall being especially efficient for conducting heat supplied by the steam pressure in the chamber 17 (or in lieu of such chamber by a hot plate, stove, etc.) to the top of the receptacle, the heat following to the point of least resistance that is, to the thinnest part of the peripheral wall.

Again, in the present instance, the edges 10 and 12 cooperate to provide for a seal, although non-air tight joint in contradistinction to such vessels as are now in use and which have the walls thereof provided with flat upper edges supporting the lid which latter is provided with a depending skirt telescoped in the receptacle, and the space between the wall of the receptacle and the lid, and between the wall of the receptacle and the skirt leaving a means of escape for these valuable food vapors.

Even though I have herein shown and described the preferred embodiment of the invention, it is to be understood that the same is susceptible of further changes, modifications and improvements coming within the scope of the appended claims.

Having thus described my invention, what I claim as new is:

1. A steam cooker comprising in combination a receptacle having a peripheral wall provided with a uniform surface on one side, and having oppositely inclined continuous merging surfaces on its other side, said inclined surfaces merging with one another near the top of the receptacle.

2. A steam cooker of the character described comprising in combination a receptacle provided with a peripheral wall having upper and lower thickened continuous merging portions on one surface tapering longitudinally to merge with one another at a point above the transverse center of the receptacle.

3. A steam cooker including in combination, a receptacle having a peripheral wall provided with upper and lower oppositely tapering continuous merging portions on one surface and having its upper portion with its thickened end at the upper edge of the receptacle, and said wall at said upper edge being thickened radially inwardly, and a lid supported on the upper edge of the receptacle.

4. A steam cooker including in combination, a receptacle having a peripheral wall provided with upper and lower oppositely tapering continuous merging portions and having its upper portion with its thickened end at the upper edge of the receptacle, and said wall at said upper edge being thickened radially inwardly, and a lid supported on the upper edge of the receptacle, said wall at said upper edge and said lid at its peripheral edge, being beveled to provide a sealed joint between said lid and wall.

In testimony whereof I affix my signature.

HAROLD E. LAUNDERVILLE.